United States Patent [19]

Bouiller et al.

[11] Patent Number: 4,762,466

[45] Date of Patent: Aug. 9, 1988

[54] CARRIER RING FOR A PROPELLER BLADE SYSTEM

[75] Inventors: Jean G. Bouiller, Brunoy; Jean-Michel Payen, Le Mee Sur Seine; Jean Pierre Ruis, Le Chatelet en Brie, all of France

[73] Assignee: Societe Nationale d'Etude et de Construction de Moteurs d'Aviation (SNECMA), Paris, France

[21] Appl. No.: 111,028

[22] Filed: Oct. 21, 1987

[30] Foreign Application Priority Data

Oct. 22, 1986 [FR] France ................ 86 14631

[51] Int. Cl.$^4$ .......................................... B64C 27/46
[52] U.S. Cl. ................................ 416/205; 416/218; 416/230
[58] Field of Search ............... 416/205, 210 R, 210 A, 416/212 R, 212 A, 214 R, 214 A, 218, 230, 248, 147

[56] References Cited

U.S. PATENT DOCUMENTS

| | | | |
|---|---|---|---|
| 3,487,879 | 1/1970 | McCarthy et al. | 416/230 |
| 3,515,501 | 6/1970 | Palfreyman et al. | 416/193 |
| 4,302,155 | 11/1981 | Grimes et al. | 416/230 |
| 4,334,827 | 6/1982 | Bouiller et al. | 416/220 |
| 4,521,160 | 6/1985 | Bouiller et al. | 416/218 |

FOREIGN PATENT DOCUMENTS

| | | | |
|---|---|---|---|
| 2347858 | 7/1963 | France . | |
| 485102 | 5/1938 | United Kingdom | 416/248 |
| 1090721 | 1/1965 | United Kingdom . | |

Primary Examiner—Robert E. Garrett
Assistant Examiner—Therese Newholm
Attorney, Agent, or Firm—Bacon & Thomas

[57] ABSTRACT

A carrier ring for a large diameter propeller system fabricated from a composite material having metallic blade mounting insert members in which are fastened roots of the propeller blades. The carrier ring has an annular ring member formed of a composite material which defines a plurality of radially extending openings, in which openings metallic blade mounting insert members are attached. The blade mounting insert members are retained in assembled relationship with the composite annular ring member by one or more fastening belts which extend around the circumference of the annular ring member in one or more grooves defined by the blade mounting inserts. The fastening belts may be formed by a plurality of turns of a fibrous filament, such as carbon filaments, so as to provide the necessary strength to retain the metallic blade mounting inserts in the composite annular ring member.

21 Claims, 11 Drawing Sheets

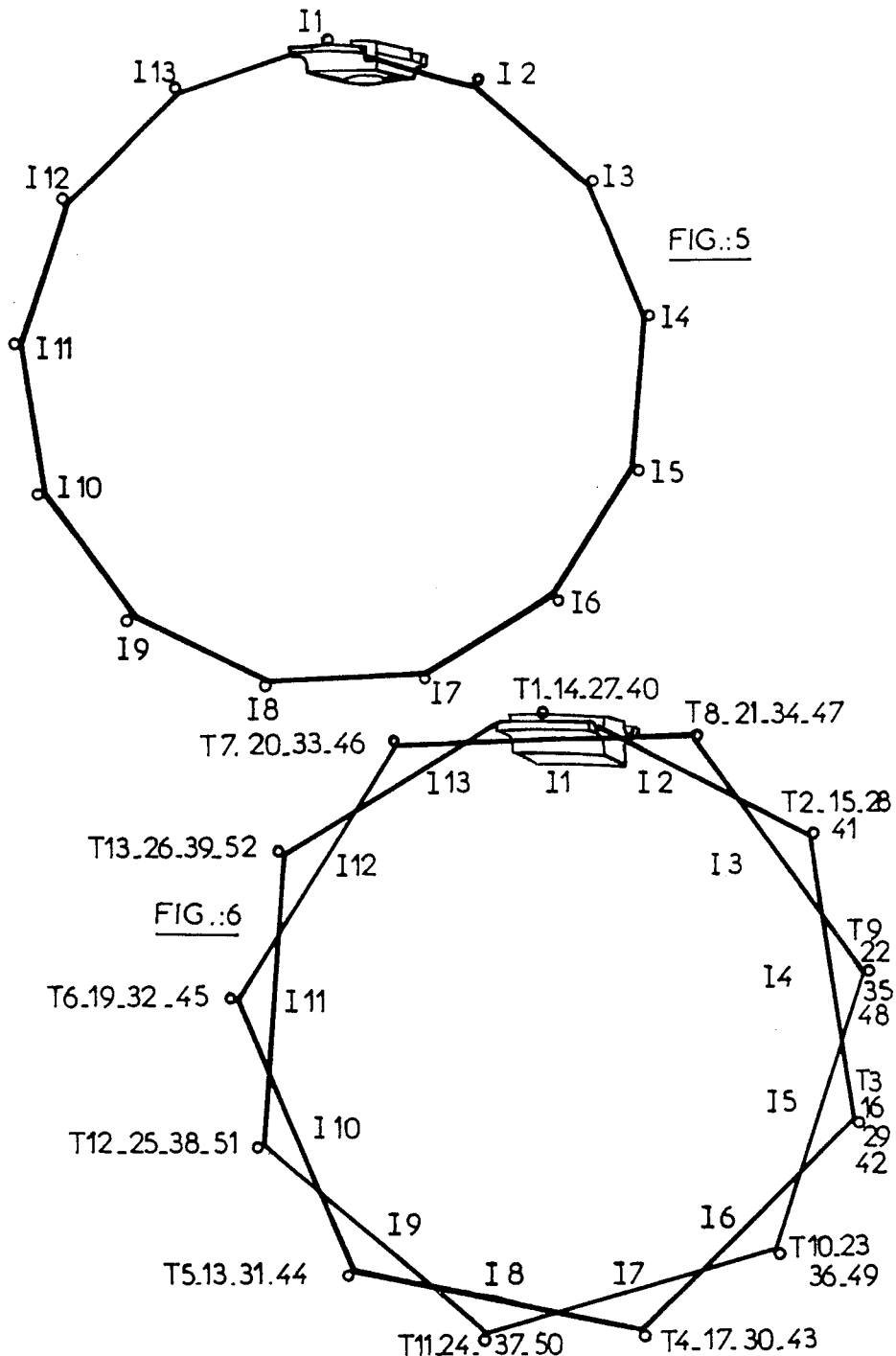

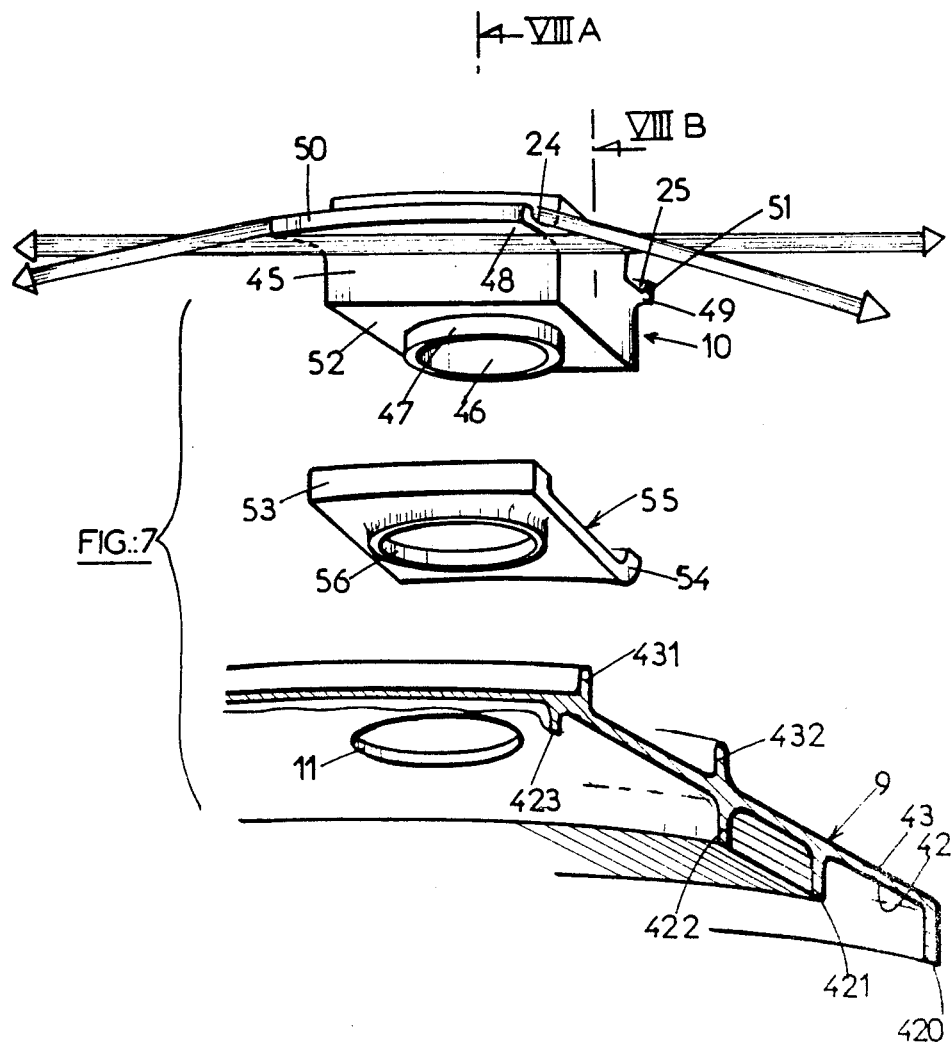

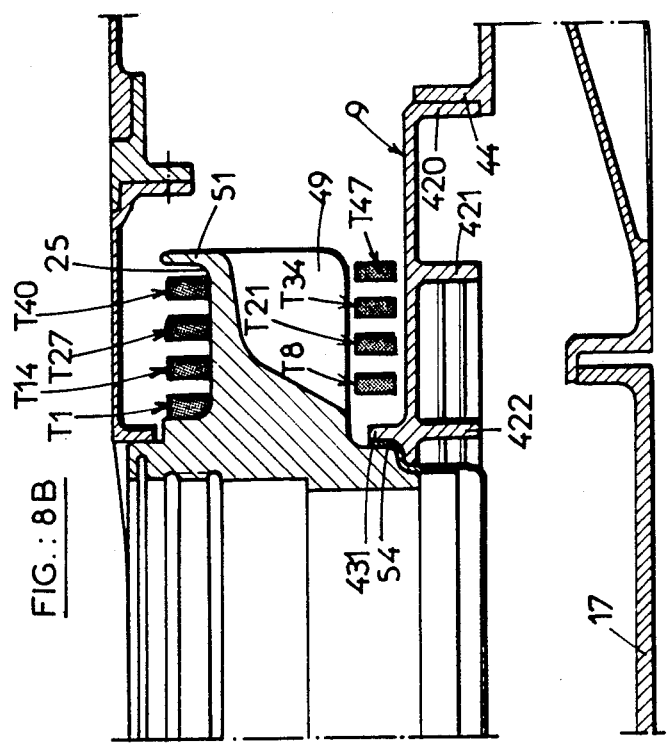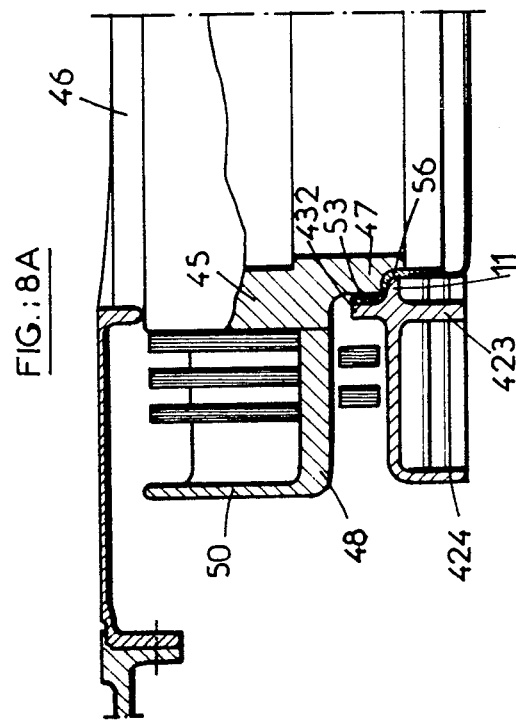

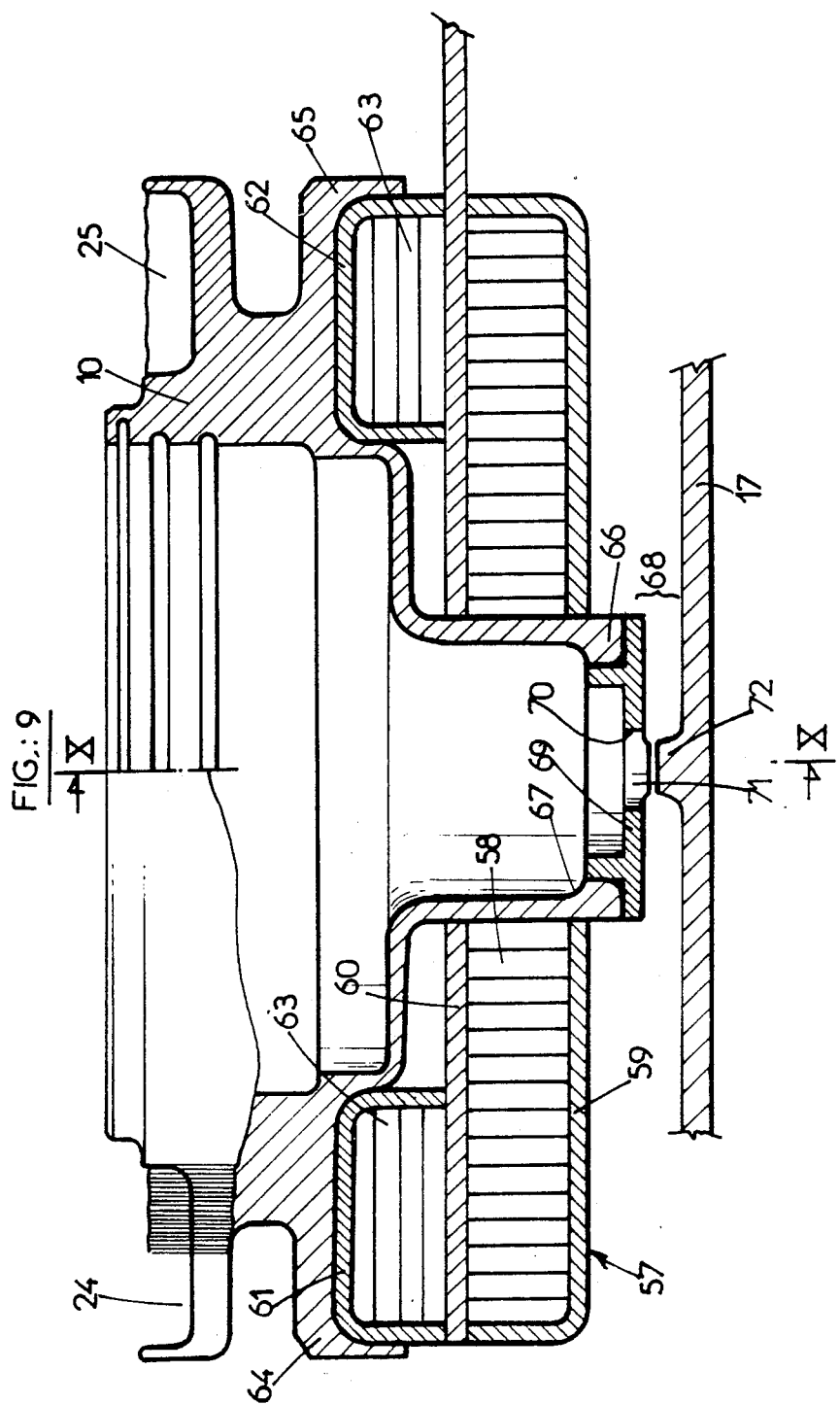

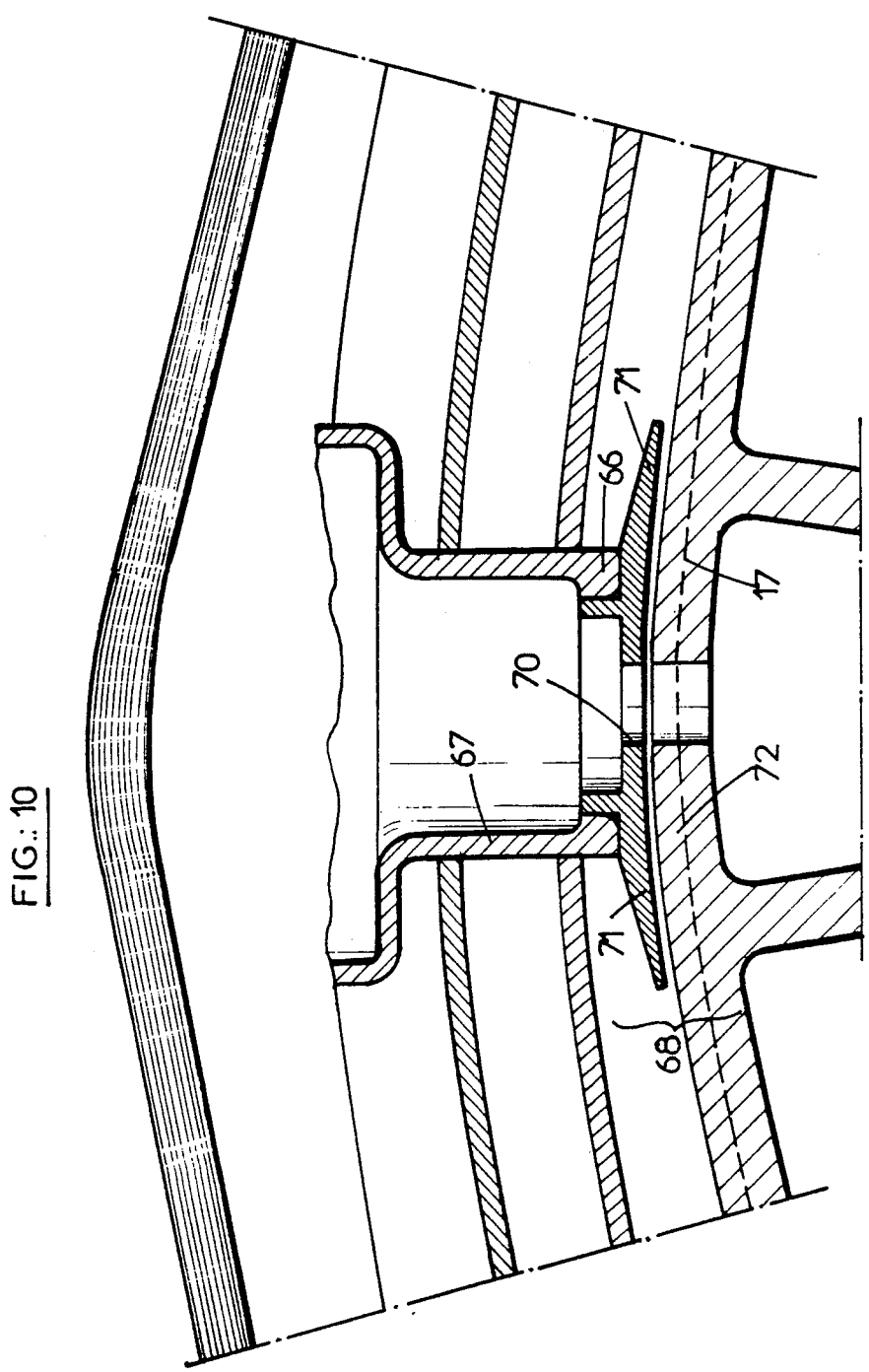
FIG.: 10

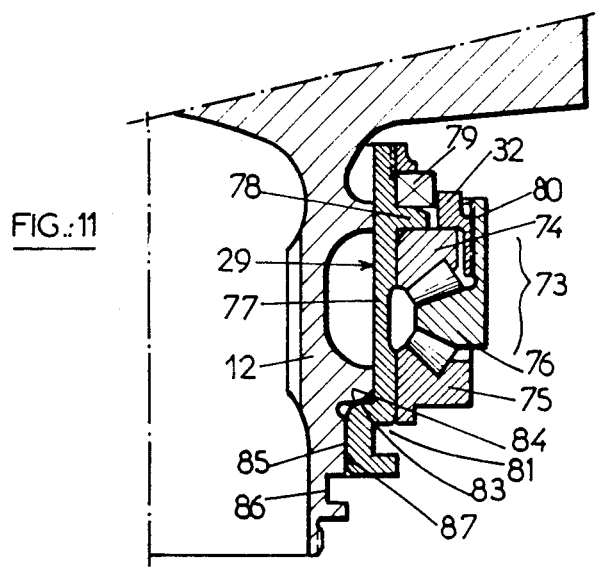
FIG.:11
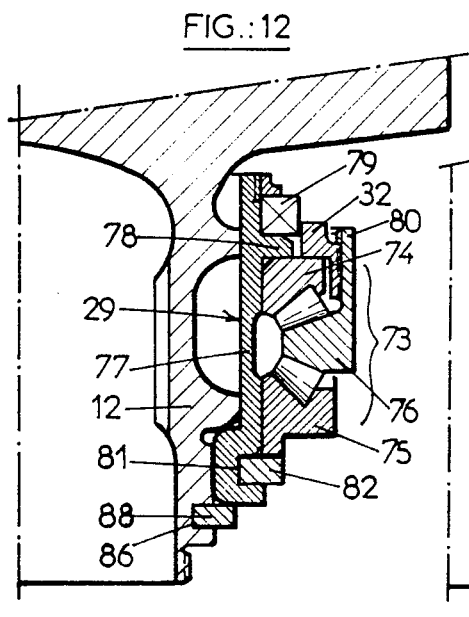
FIG.:12
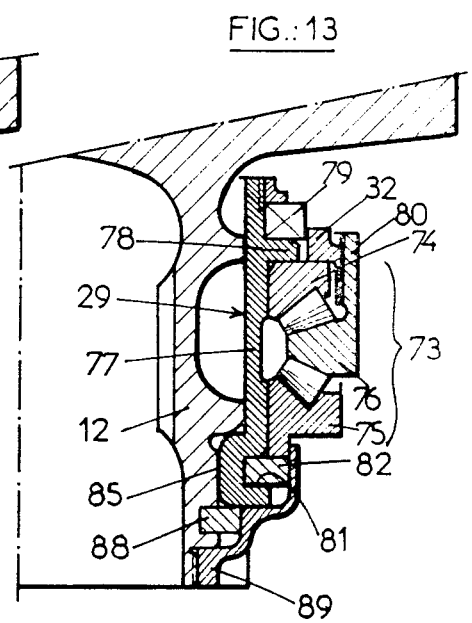
FIG.:13

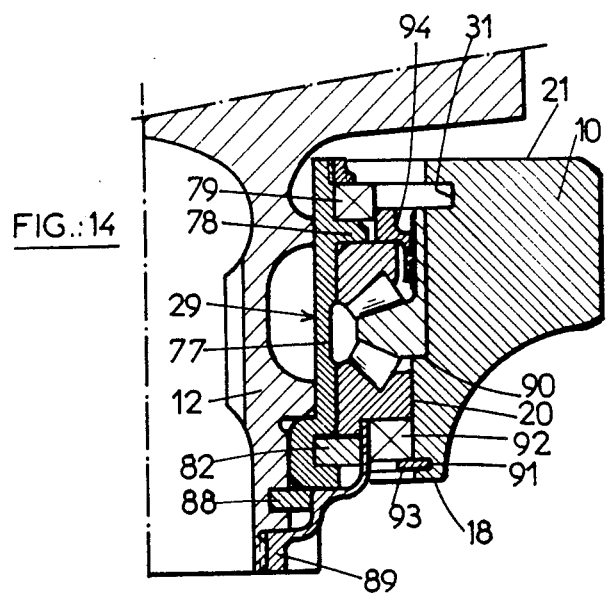
FIG.:14
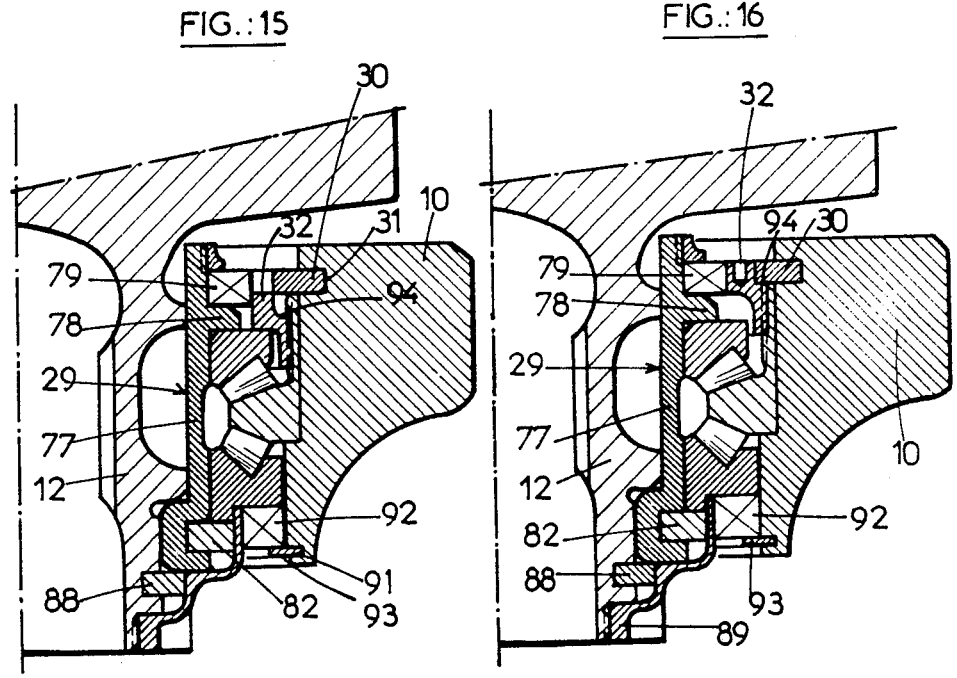
FIG.:15
FIG.:16

CARRIER RING FOR A PROPELLER BLADE SYSTEM

BACKGROUND OF THE INVENTION

The invention relates to a carrier ring for a large diameter propeller blade system, more specifically such a carrier ring driven by a gas turbine engine.

Carrier rings for propeller blade systems are known in the art, a typical example of which is illustrated in FIG. 1. The carrier rings, which are usually made of high strength metal, such as titanium, comprise a cylindrical portion defining radially extending openings in which the roots of the propeller blades are mounted by means of thrust bearings. The carrier ring is attached to and driven by a shaft of the gas turbine, and is provided with a shroud about its periphery. The roots of the propeller blades typically include means for adjusting the pitch of the blades.

The known carrier rings, together with their fastening devices, comprise a disk of comparatively substantial mass which must withstand a significant level of stress due to the centrifugal forces imposed upon it. Thus far, it has been impractical to utilize lower density materials to fabricate these carrier rings due to the large centrifugal forces generated by large diameter propeller blades. It has also been heretofore impossible to compensate for the increase in localized stresses which would occur if a blade were to become detached from the carrier rings.

SUMMARY OF THE INVENTION

An object of the present invention is to provide a carrier ring for a large diameter propeller system fabricated from a composite material having metallic blade mounting insert members therein in which are fastened the roots of the propeller blades.

The carrier ring according to the invention comprises an annular ring member formed of a composite material which defines a plurality of radially extending openings, in which openings metallic blade mounting insert members are attached. The blade mounting insert members are retained in assembled relationship with the composite annular ring member by one or more fastening belts which extend around the circumferance of the annular ring member in one or more grooves defined by the blade mounting inserts. The fastening belts may be formed by a plurality of turns of a fibrous filament, such as carbon filaments, so as to provide the necessary strength to retain the metallic blade mounting inserts in the composite annular ring member.

BRIEF DESCRIPTION OF THE DRAWINGS

FIG. 5 is a schematic representation of a first embodiment for winding the fibers of the fastening belt about the carrier ring according to the invention.

FIG. 6 is a schematic representation of a second embodiment for winding the fibers of the fastening belt about the carrier ring according to the invention.

FIG. 7 is a partial, exploded, perspective view illustrating a second embodiment of the carrier ring according to the invention.

FIG. 8A is a partial view taken in the direction of arrow VIIIA in FIG. 7.

FIG. 8B is a partial, cross-sectional view taken in the direction of arrow VIIIB in FIG. 7.

FIG. 9 is a partial, longitudinal cross-sectional view of a third embodiment of the carrier ring according to the invention.

FIG. 10 is a cross-sectional view taken along line X—X in FIG. 9.

FIGS. 11-16 show the sequence of operation for assembling the roots of the propeller blades in the blade mounting insert members according to the invention.

DETAILED DESCRIPTION OF THE PREFERRED EMBODIMENTS

Figure 1:
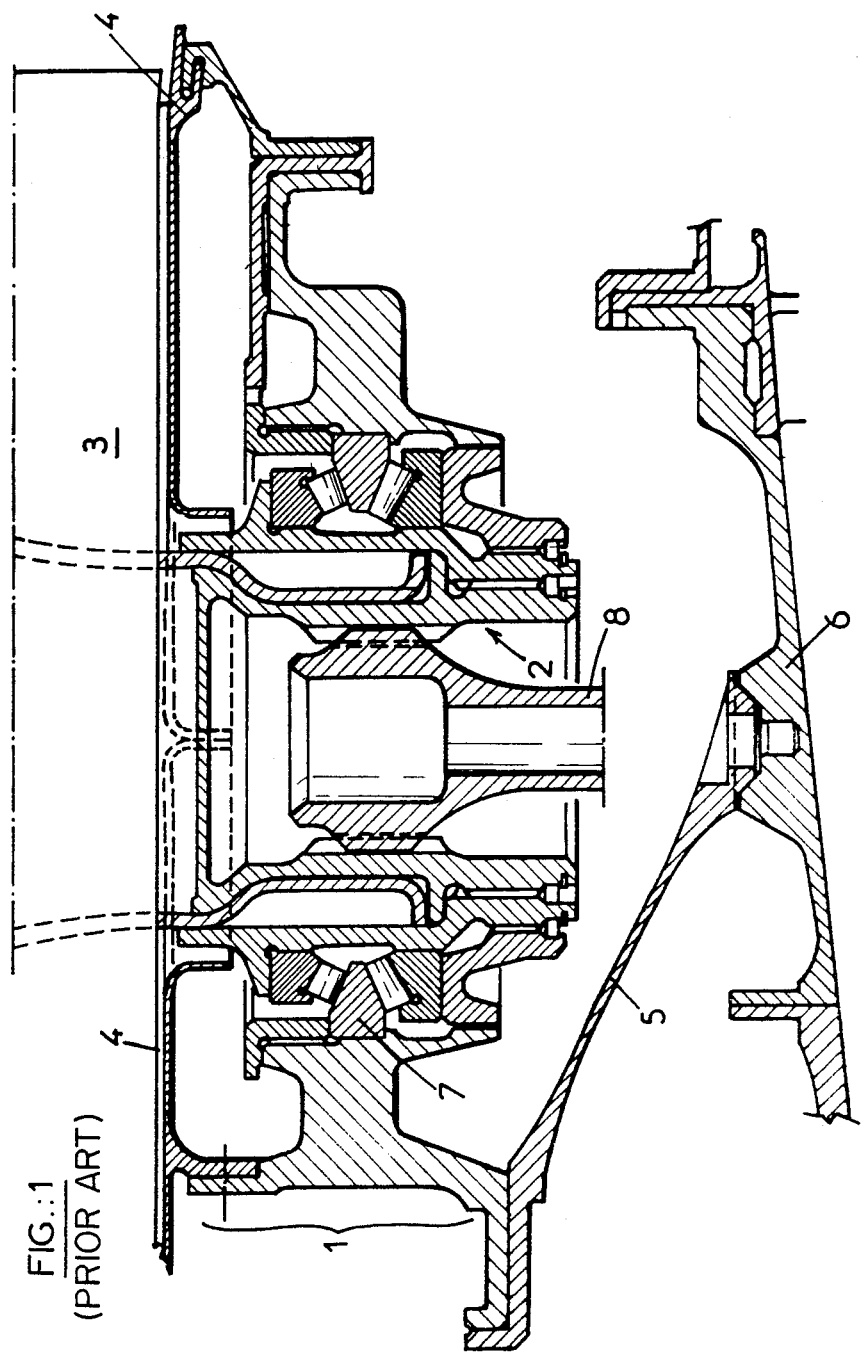
FIG. 1 is a partial, longitudinal sectional view of a carrier ring according to the prior art.

FIG. 1 illustrates a carrier ring which is typical of the prior art devices. The carrier ring 1 comprises a annular, metallic structure which defines a plurality of radially extending openings which are uniformly distributed about its periphery. Throughout this application, the terms "radial" and "axial" will be made in reference to the longitudinal axis of the gas turbine engine with which the propeller system is associated. As illustrated in FIG. 1, the roots 2 of propeller blades 3 are fastened in each of the openings defined by the carrier ring 1. Typically, carrier ring 1 is fabricated from a high strength metal, such as titanium. A shroud 4 is attached to the propeller blade hub so as to cover the carrier ring structure.

The carrier ring 1 is attached to a drive shaft 6 of a gas turbine engine by connecting portions 5. Drive shaft 6 rotates about the longitudinal axis of the gas turbine engine which extends from left to right as shown in FIG. 1.

Each of the roots 2 of the propeller blades 3 is attached in the openings in the carrier ring via a thrust bearing assembly 7. Thrust bearing assembly 7 allows the blades to be rotated about a pitch axis by shaft 8 so as to adjust the pitch of the blade 3.

Figure 2:
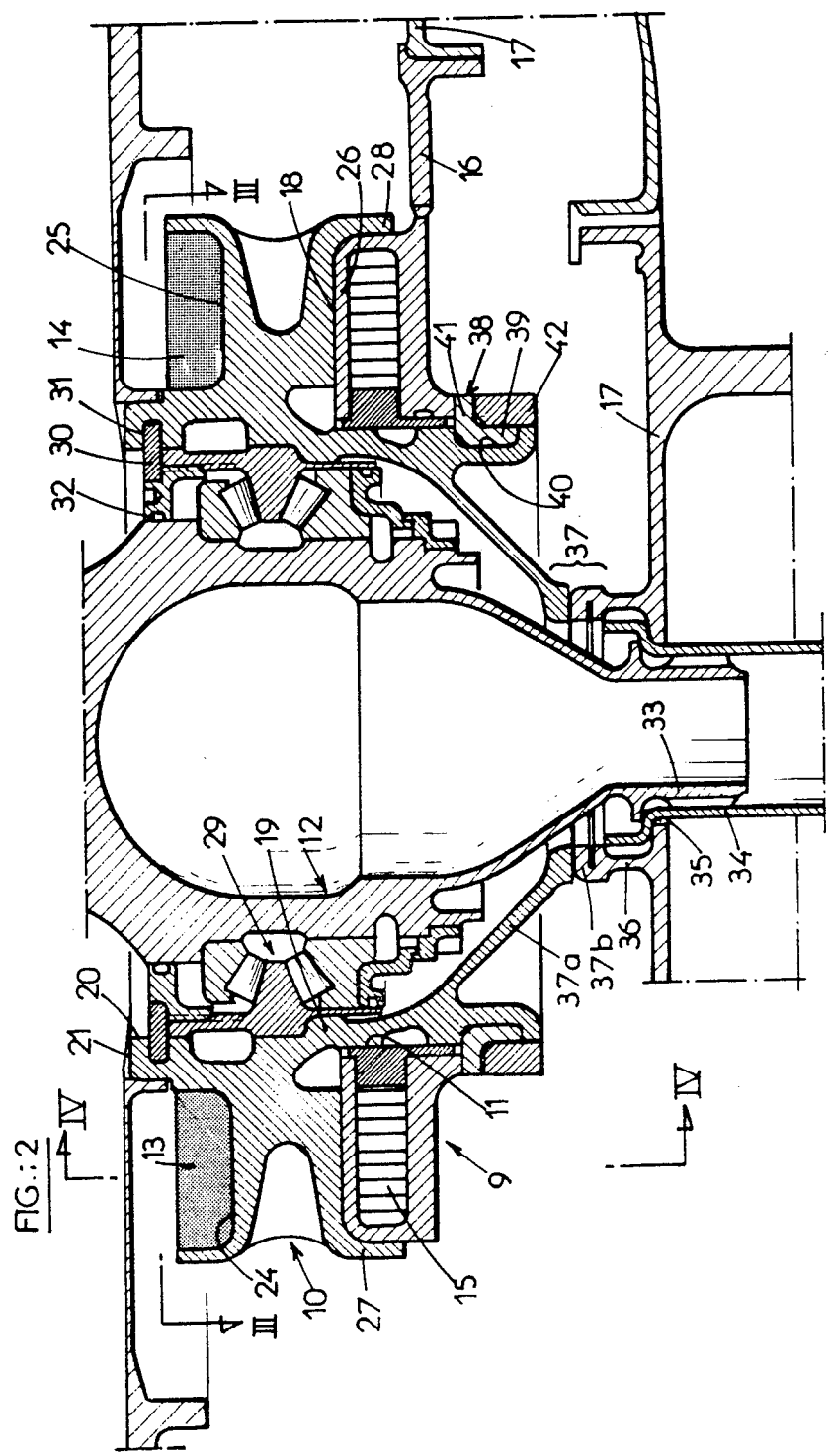
FIG. 2 is a partial, longitudinal cross-sectional view of a first embodiment of the carrier ring according to the invention.

The first embodiment of the carrier ring according to the invention is illustrated in FIG. 2. In this embodiment, the carrier ring comprises an annular ring member 9, fabricated from a composite material, which defines a plurality of generally radially extending openings 11. A metallic blade mounting insert member 10 is mounted in each of the radial blade openings 11. The blade mounting insert members are retained in the annular ring member 9 by peripherally extending fastening belts 13 and 14, formed of synthetic fiber filaments.

Figure 3:
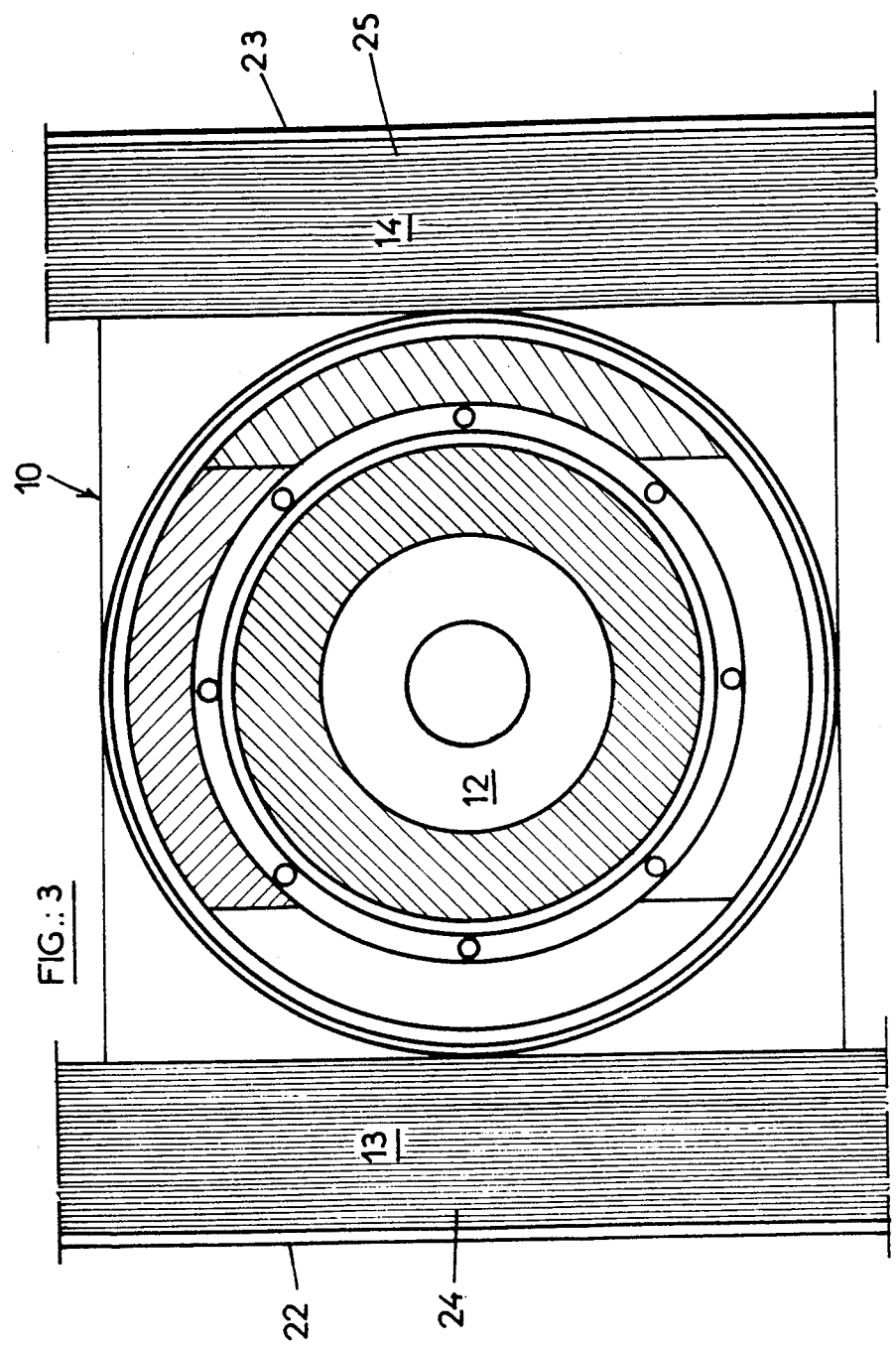
FIG. 3 is a view taken along line III—III in FIG. 2.

In the top view shown in FIG. 3, it can be seen that the metallic blade mounting insert members have an approximately rectangular shape. The radially inner side of the portions 18 of insert members 10 which bears against the radially outer surface of the annular ring member 9 have a radius of curvature matching that of annular ring member 9, so as to evenly distribute the forces over the largest possible area.

In the structure shown in FIG. 2, the annular ring member comprises a core 15 of cellular material, such as a metallic honeycomb core, wherein the axes of the core cells extend in a radial direction approximately perpendicular to the longitudinal axis of the gas turbine. The core 15, which has radially inner and outer surfaces as well as axially front and rear surfaces, is covered by a composite material which may consist of synthetic resin impregnated fibers. The composite material covers substantially all of the exposed surfaces of the honeycomb core. The radial openings 11, which extend through the honeycomb core, have their peripheries reinforced by plastic or metallic rings. An axial extension 16 of the annular ring member is attached to the shaft 17 of the gas turbine engine via known means.

In this embodiment, the metallic blade mounting insert members 10 define a radially extending bore 20 into which extends shoulder 19, the bore 20 opening radially outwardly at the outer side 21 of the insert member 10. The insert members 10 each define a radially outwardly opening, circumferentially extending grooves 24 and 25 with the front and rear of these grooves defined by radially extending flanges 22 and 23, respectively. The fastening belts 13 and 14 are disposed in grooves 24 and 25, respectively, such that the radially inner sides 18 of the insert members 10 bear against the convex periphery 26 of the annular ring member 9.

The blade mounting insert members 10 each have front and rear radially inwardly extending flanges 27 and 28 which bear against corresponding radial surfaces formed on the annular ring member 9 so as to properly axially locate the blade mounting insert member 10 with respect to the annular ring member 9.

The filaments forming the fastening belts 13 and 14 may be wound such that each turn of the filament passes through either groove 24 or 25 of all of the blade mounting insert members 10, as schematically illustrated in FIG. 5. In this figure, the insert members 10 are schematically illustrated at points I1, I2 . . . , I12, I13. The filaments may be wound around the periphery of the annular ring member 9 and the grooves 24 and 25 of blade mounting insert members 10, either before or after the propeller blades have been installed in each of the blade mounting insert members 10.

The roots 12 of the blades are retained in each of the blade mounting insert members 10 by thrust bearings 29. The thrust bearings 29 bear against shoulder 19 to prevent radially inward movement with respect to the blade mounting insert members 10. Radially outward movement of the thrust bearings 29 is prevented by locking segments 30 which engage a recess 31 defined in the blade mounting insert member 10 and the upper portion of the thrust bearing 29. Displacement of the locking segments 30 is prevented by nut 32 which is threadingly engaged with the thrust bearing 29 and contacts the locking segments 30. A detailed explanation of the specific assembly process will be described in relation to FIGS. 11–16.

The radially inner end 33 of blade root 12 cooperates with splined pitch drive shaft 34 which extends through an aperture 35 formed in the turbine drive shaft 17. Shaft 34 is rotated by known means so as to vary the pitch of the propeller blade. The aperture 35 is surrounded by an annular boss 36 which projects radially outwardly from the surface of the turbine shaft 17. Foot portion 37a extends inwardly from blade mounting insert member 10 such that its radially innermost portion is adjacent to, but spaced from, edge flange 37b of boss 36. These elements form a stress amplitude limiter 37, the object of which is to distribute the stresses over the carrier ring in case a propeller blade breaks. In such an incident, the relieved annular structure retracts such that foot portion 37a comes into contact with flange edge 37b. The contact between these elements limits any further retraction to thereby maintain the fibers forming the fastening belts 13 and 14 under tension. The fibers may comprise unidirectional, carbon-fiber filaments.

In case the fastening belts 13 or 14 should rupture, additional means are provided to keep each of the blade mounting insert members 10 in position in the annular ring member 9. A retaining member 38, having a substantially "L" shaped cross-section, is disposed in recess 40 formed in a lower portion of the blade mounting insert member 10, such that a portion 41 bears against a radially inner facing portion of the annular ring member 9. The retaining member 38 is affixed in position by retaining ring 42. Thus, as can be seen, the interengagement of the retaining member 38 with both the annular ring member 9 and the blade mounting insert member 10 will serve to retain these elements in assembled relationship should either of the fastening belts 13 or 14 fail.

Figure 4:
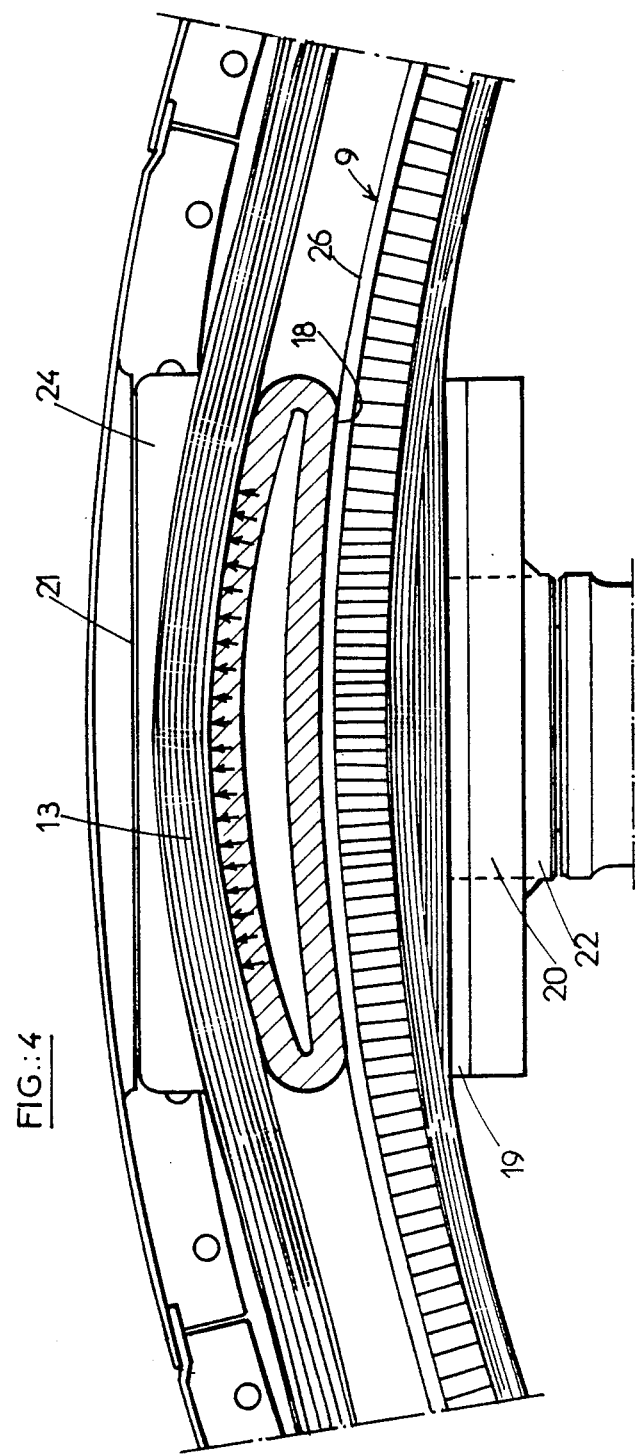
FIG. 4 is a view taken along the line IV—IV in FIG. 2.

As illustrated in FIG. 4, the bottoms of grooves 24 and 25 have a convex shape, the radius of curvature of which is less than that of the inner surface 18 in order to better distribute the contact pressures over the area of the blade mounting insert members, and to maintain the fibers of the fastening belts 13 and 14 under tension.

An alternative method of winding the fastening belt filaments is schematically illustrated in FIG. 6. This method may be utilized where an odd number of blade mounting insert members are to be attached to the annular ring member. As in FIG. 5, the blade mounting insert members 10 are indicated at I1, I2..., I12 and I13. The sequence of blade mounting inserts over which the fiber windings sequentially pass is illustrated by the numbers in FIG. 6 prefaced by a T. Thus, beginning at insert I1, the filament passes over inserts I3, I5, I7, I9, I11, and I13 in sequence. From I13, the filament passes to inserts I2, I4, I6, I8, I10, and I12 before once again passing over insert I1. Thus sequence continues until the requisite number of turns are wound. This method of winding may be utilized in both grooves 24 and 25 for the respective mounting insert members.

A second embodiment of the carrier ring is illustrated in FIGS. 7, 8A and 8B. In this embodiment, the annular ring member 9 comprises a generally annular median portion having radially outward facing surface 43 and a radially inward facing surface 42. Flanges 420–424 extend radially inwardly from surface 42, while flanges 431 and 432 extend radially outwardly from surface 43. The downstream rib 420 serves as a bracket to attach the annular ring member 9 to corresponding bracket 44 attached to gas turbine drive shaft 17. The blade mounting openings 11 defined by annular ring member 9 are located between inner flanges 422 and 423, and between outer flanges 431 and 432. A first honeycomb core extends around the inner surface 42 between flanges 421 and 422; a second honeycomb core extends around surface 42 between flanges 422 and 423; and a third honeycomb core extends around inner surface 42 between flanges 423 and 424. The axes of the cells of the honeycomb cores all extend substantially parallel to the longitudinal axis of the gas turbine engine, so as to compensate for the dynamic, aerodynamic and centrifucal forces exerted on the annular ring member.

The radially outwardly extending flanges 431 and 432 serve to axially locate the blade mounting insert members 10. In this embodiment, each of the insert members 10 define axially opposite sides 45 extending substantially parallel to the flanges 431 and 432, respectively. The radially innermost surface 52 of the insert members 10 has an annular projection 47 extending therefrom which extends around opening 46. The annular projection 47 is adapted to extend into blade mounting openings 11 defined by the annular ring member 9. Flanges 48 and 49 extend from the axial surfaces of the insert members 10 and define the grooves in which the filament fastening belts are wound. Ribs 50 and 51 extend from the ends of the flanges to define the axial limits of the grooves.

The radially inner surface 52 may be curved so as to match the radius of curvature of the annular ring member 9, or may be formed as a flat plane. In the latter instance, an intermediate member 55 is interposed between each of the insert members 10 and the annular ring member 9. The intermediate member comprises a base portion 55 defining a central opening having a shoulder 56 extending radially inwardly around the opening. Ribs 53 and 54 extend radially outwardly from the axial extremeties of the base portion. The opening through the base portion 55 of the intermediate member accommodates the annular shoulder 47 of the blade mounting insert member 10, while shoulder 56 extends into opening 11 defined by the annular ring member 9. Ribs 53 and 54 are interposed between the radially outwardly extending flanges 431 and 432, and the planar surfaces 45 of the insert member 10. The radially inner surface of base portion 55 may be curved to match annular ring member 9.

The winding system schematically illustrated in FIG. 6 is also shown in conjunction with the embodiment described in FIGS. 7, 8A and 8B. The filament windings T1, T8, T14, T27, T21, T34, and T40 shown in FIG. 8B correspond to similar numbers shown in FIG. 6.

A third embodiment of the carrier ring is illustrated in FIGS. 9 and 10. In this embodiment, the annular ring member 9 comprises a generally annular median portion 60 having a radially inner annular portion 59 attached thereto so as to define a first chamber therebetween. A honeycomb core 58 is disposed in this first chamber. Annular channel members 61 and 62 are attached to the median portion 60 so as to extend in a generally radially outward direction therefrom. The channel members 61 and 62 define second and third chambers with respect to the annular median portion. Second and third honeycomb cores 63 are disposed in the second and third chambers, respectively. As illustrated in FIG. 9, the cells of the axes of honeycomb core 58 extend substantially perpendicular to the longitudinal axis of the gas turbine and to the cell axes of honeycomb cores 63. The orientation of the cell axes serves to increase both the axial and radial strength of the annular ring member.

The blade mounting insert member 10 as in the previous embodiments, defines radially outwardly opening grooves 24 and 25 to accommodate the filaments of the fastening belt members 13 and 14. Axial location of the insert members 10 is achieved by the interengagement of flanges 64 and 65, which extend generally radially inwardly, with the axial surfaces of first and second channel members 61 and 62 respectively.

A generally circumferential boss 72 is formed on the drive shaft 17 of the gas turbine. Cooperation between boss 72 and stop element 69 attached to the end 66 of foot portion 67 of the blade mounting insert member 10 functions the same as the stress limiter 37 previously described. Stop element 69, which has circumferentially extending portions 71, is adjacent to but slightly spaced from the outer surface of boss 72 under normal operating conditions. Should failure of one of the blades cause the annular ring 9 to compress, contact between the stop member 69 and the boss 72 will prevent any further contraction thereby maintaining the filaments of the fastening belts under tension. Stop 69 may define opening 70 to permit passage therethrough of the drive shaft for adjusting the pitch of the propeller blade.

A description of the assembly of the propeller blade with the carrier ring will be described in reference to FIGS. 11-16. It is to be understood that this assembly procedure may be utilized with any of the embodiments of the carrier rings described herein.

FIGS. 11-13 show the steps of subassembling in a thrust bearing 73 with the root portion 12 of the propeller blade. The thrust bearing 73 has a central race 76, radially outer race 74, and radially inner race 75 with roller bearing elements disposed therebetween in known fashion. Radially outward race 74 bears against flange 78 formed on mounting bracket 77. A seal 79 bears against the opposite side of flange 78, and is retained thereon by known means. Central race 76 is attached to shoulder 80 on which nut 32 is threadingly engaged. The nut 32 is threaded to its radially innermost position in which it bears against radially upper race 74.

Radially inner race 75 is retained in position by snap ring 82 disposed in groove 81 formed in the mounting bracket 77. Similarly, bracket 77 is attached to the root 12 by snap ring 88 engaging groove 86. A cap nut 89 threadingly engages root portion 12 to retain snap rings 82 and 88 in position.

The subassembly of FIG. 13 is attached to the blade mounting insert member 10 as illustrated in FIGS. 14-16. The insert member 10 defines radially outermost groove 31 and radially innermost groove 91, both of which open into the bore 20 of the insert member 10. The subassembly is inserted into this bore until the central race 76 contacts shoulder 90 such that the radially outermost side of nut 32 is below the plane of groove 31. Seal 92 is inserted between the cap nut 89, the radially inner race 75, and the insert member 10, and is retained in position by snap ring 93 extending into groove 91.

Locking segments 30 are inserted in groove 31 and are sized such that a portion extends into the bore 20 of the insert member 10 so as to contact the upper surface of shoulder 80. Nut 32 is then rotated such that shoulder 94 contacts the exposed side of locking segment 30, as shown in FIG. 16, to prevent any inadvertent displacement of this segment from the groove 31. The locking segments 30, as well as the snap rings 82 and 88, absorb all of the forces generated by the centrifugal action of the various components, resulting in an increase in strength over the prior art systems. In the conventional assembly, as illustrated in FIG. 1, the center race, as well as the radially inner race, are maintained in position by threaded elements such as nuts, which subjects the threads to the shearing stresses due to the centrifugal forces exerted on the structure. Particularly where large propeller blades are concerned, the threads are not capable of withstanding the level of such centrifugal forces.

The carrier ring according to the invention provides high operational safety due to the way the blade mounting insert members are attached to the composite structure by the fiber filament fastening belts, and due to the amplitude limiter which will maintain these belts in tension. It has been found that the use of composite material according to this invention resulted in a weight reduction of approximately 30% with respect to a corresponding titanium carrier ring while maintaining the same rigidity.

The foregoing description is provided for illustrative purposes only and should not be construed as in any way limiting this invention, the scope of which is defined solely by the appended claims.

We claim:

1. A carrier ring for a large, rotatable propeller blade system driven by a gas turbine having a longitudinal axis comprising:
   (a) an annular ring member formed of composite material disposed about the longitudinal axis of the gas turbine, the annular ring member defining a plurality of blade openings having substantially radially oriented central axes;
   (b) a metallic blade mounting insert member mounted in each of the blade openings, each blade mounting insert defining at least one groove extending in a generally circumferential direction; and
   (c) a fastening belt formed of fiberous material extending generally circumferentially around the annular ring member in the at least one groove of each of the blade mounting members so as to retain each of the blade mounting members attached to the annular ring member.

2. The carrier ring according to claim 1 wherein each metallic blade mounting insert member defines a generally radially extending, outwardly opening bore and wherein the at least one groove opens in a radially outward direction.

3. The carrier ring according to claim 2 wherein the fastening belt comprises a plurality of turns of fiberous filaments.

4. The carrier ring according to claim 3 wherein each turn of the fiberous filaments passes through the at least one groove of each blade mounting insert member.

5. The carrier ring according to claim 3 wherein the carrier ring has an odd number of blade mounting insert members and wherein alternate turns of the fiberous filaments pass through the at least one groove of alternate blade mounting insert members.

6. The carrier ring according to claim 2 wherein the annular ring member comprises:
   (a) a generally annular median portion;
   (b) a radially inner annular portion attached to the median portion so as to define a first chamber therebetween;
   (c) a first honeycomb core disposed in the first chamber;
   (d) first and second annular channel members attached to and extending around a radially outer surface of the annular median portion, the first and second annular channel members and the median portion defining second and third chambers therebetween; and
   (e) second and third honeycomb cores disposed in the second and third chambers, respectively.

7. The carrier ring according to claim 6 wherein axes of the cells of the first honeycomb core extend substantially perpendicular to the axes of the cells of the second and third honeycomb cores.

8. The carrier ring according to claim 7 wherein the axes of the cells of the first honeycomb core extend generally perpendicular to the longitudinal axis of the gas turbine.

9. The carrier ring according to claim 2 wherein the annular ring member comprises:
   (a) an annular honeycomb core having radially inner and outer surfaces, and axially front and rear surfaces, the honeycomb core defining the plurality of blade openings;
   (b) composite material covering the surfaces of the honeycomb core; and
   (c) composite material lining the blade openings.

10. The carrier ring according to claim 2 further comprising:
    (a) substantially radially extending front and rear surfaces defined by the annular ring member; and
    (b) first and second radially inwardly extending flanges on each blade mounting insert member positioned so as to contact the front and rear surfaces of the annular ring member to axially locate the blade mounting insert member with respect to the annular ring member.

11. The carrier ring according to claim 2 further comprising:
    (a) a thrust bearing assembly located in the bore defined by each of the blade mounting insert members;
    (b) retaining means to retain each thrust bearing assembly in its respective bore.

12. The carrier ring according to claim 11 wherein the retaining means comprises:
    (a) a shoulder defined on the blade mounting insert member and located so as to bear against a radially inner portion of the thrust bearing assembly;
    (b) recesses defined by the blade mounting insert members, each recess opening into a bore;
    (c) locking segments located in each recess and extending therefrom so as to contact a radially outer portion of the thrust bearing assembly; and
    (d) locking nut means threadingly engaged with the thrust bearing assembly and adapted to contact the locking segments to retain them in their respective recesses.

13. The carrier ring according to claim 2 further comprising:
    (a) a recess defined in a radially inner portion of the blade mounting insert member;
    (b) a retaining member having a substantially "L" shaped cross-section disposed in the recess such that a portion of the retaining member extends from the recess and contacts a radially inner portion of the annular ring member; and
    (c) means to affix the retaining member in the recess.

14. The carrier ring according to claim 2 wherein the annular ring member comprises:
    (a) a generally annular median portion;
    (b) at least first, second, third and fourth flanges extending generally radially inwardly from the median portion such that the blade openings extend through the median portion between the second and third flanges;
    (c) fifth and sixth flanges extending generally radially outwardly from the median portion, the fifth and sixth flanges serving as axial locating means for the blade mounting insert members;
    (d) a first honeycomb core extending between the first and second flanges;
    (e) a second honeycomb core extending between the second and third flanges; and
    (f) a third honeycomb core extending between the third and fourth flanges.

15. The carrier ring according to claim 14 wherein the blade mounting insert member defines opposite axially facing sides extending substantially parallel to the fifth and sixth flanges.

16. The carrier ring according to claim 15 wherein the blade mounting insert member further comprises an annular projection extending generally radially inwardly around the bore, the projection adapted to extend into an opening defined by the annular ring member.

17. The carrier ring according to claim 16 further comprising an intermediate member interposed between the blade mounting insert member and the annular ring member.

18. The carrier ring according to claim 17 wherein the intermediate member comprises:
   (a) a base portion defining a second opening adapted to receive the annular projection of the blade mounting insert member;
   (b) a shoulder extending around the second opening in a generally radially inward direction adapted to extend into the opening defined by the annular ring member; and
   (c) ribs extending from the base portion in a generally radially outward direction substantially parallel to the fifth and sixth flanges, respectively.

19. The carrier ring according to claim 2 further comprising:
   (a) a plurality of propeller blades, each blade having a root portion; and
   (b) means to attach the root portion to a blade mounting insert member such that the blade is movable about a pitch axis extending substantially perpendicular to the longitudinal axis of the gas turbine.

20. The carrier ring according to claim 19 further comprising:
   (a) an annular boss formed on a drive shaft of the gas turbine and extending around a root portion of a propeller blade; and
   (b) a foot portion extending from the blade mounting insert member adjacent to, but spaced from, the annular boss.

21. The carrier ring according to claim 19 further comprising:
   (a) a circumferential boss formed on a drive shaft of the gas turbine;
   (b) a foot portion formed on the blade mounting insert and extending radially inwardly of the annular ring member; and
   (c) stop means attached to the foot portion so as to be adjacent to, but spaced from, the circumferential boss.

* * * * *